Jan. 30, 1962

C. A. SANFORD 3,019,012

COLLATOR

Filed March 25, 1960

INVENTOR
Charles A. Sanford

BY *J. N. Munsey*

ATTORNEY

Jan. 30, 1962   C. A. SANFORD   3,019,012
COLLATOR
Filed March 25, 1960   4 Sheets-Sheet 3

INVENTOR
Charles A. Sanford
BY
ATTORNEY

Jan. 30, 1962 C. A. SANFORD 3,019,012
COLLATOR
Filed March 25, 1960 4 Sheets-Sheet 4
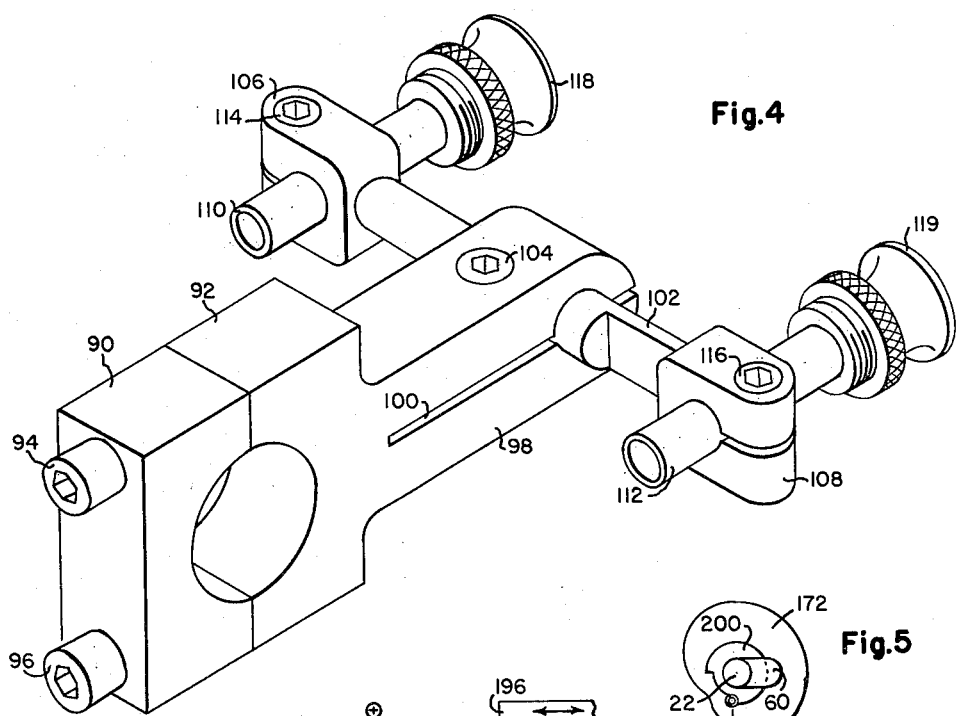
Fig.4
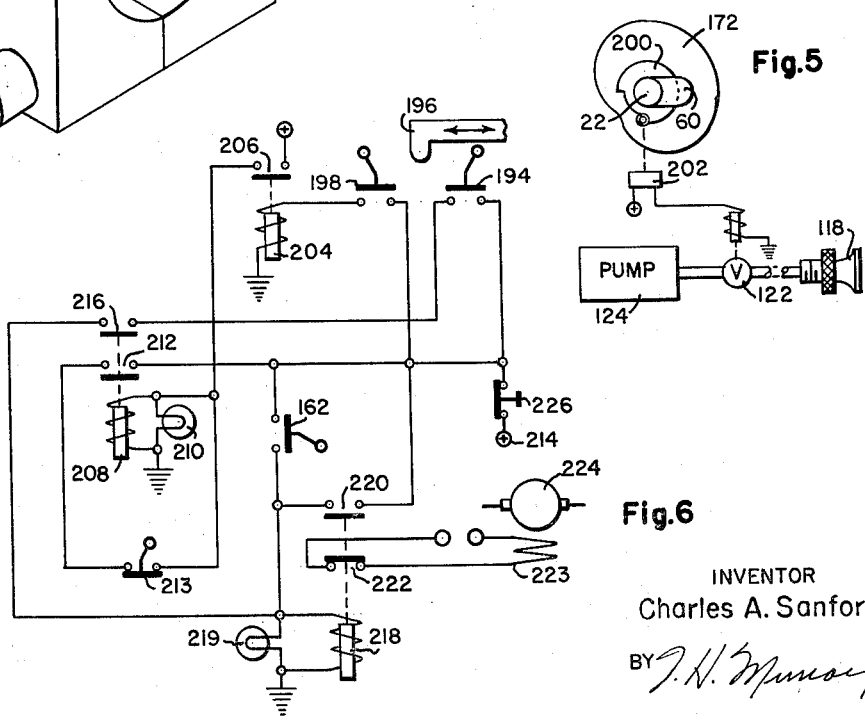
Fig.5
Fig.6
INVENTOR
Charles A. Sanford
BY
ATTORNEY

United States Patent Office 3,019,012
Patented Jan. 30, 1962

3,019,012
COLLATOR
Charles A. Sanford, Sagerstown, Pa., assignor to The American Paper Products Company, Youngstown, Ohio, a corporation of Ohio
Filed Mar. 25, 1960, Ser. No. 17,635
22 Claims. (Cl. 270—58)

This invention relates to a collator of the type having a series of feeders for feeding flat articles to a conveyor from corresponding supply stacks, the advance of the conveyor being synchronized with the operation of the feeders to cause desired groups of articles to be formed progressively on the conveyor with the articles in each finished group arranged in the same sequence as the feeders. The flat articles arranged by the collator may, for example, be sheets, envelopes, or other similar articles.

If any one feeder in the collator fails to function correctly either by failing to pick up an article from a supply stack or by picking up two or more articles at once, some remedial action must be taken in order to avoid the formation of a defective group of articles on the conveyor. In the usual collator, passage of more than one or less than one article through the feeder is sensed by thickness gages or the like, the arrangement being such that the gages will produce a visual indication identifying the feeder which is functioning improperly if the thickness sensed by the gages at that particular feeder is above or below the thickness of a single article. The gages are also used to produce an electrical signal which will automatically stop the collator whenever more than one or less than one article is passing through any feeder. Thus, when the collator stops, the operator will observe the visual indication identifying the feeder which has functioned improperly and may add an article to a group on the conveyor or remove an excess article, as may be required, before again starting the machine. As an alternative, the signals produced by the gages may be used to actuate means for automatically rejecting a defective group from the conveyor.

The thickness gages referred to above are usually two in number, one of which senses the absence of any article passing through the feeder and the other of which senses the passage of two or more articles. In the past, such gages consisted of a single pair of contacting rollers, one of which was movable toward and away from the other. If the absence of an article passing through the feeder was to be sensed, one of the rollers was provided with an annular rim or projection on its periphery which fit into a cooperating annular groove on the other roller, the arrangement being such that whenever an article passed through the feeder it would also pass through the rollers, thereby forcing the rim on the one roller out of the groove on the other roller; and the resulting movement in the one roller would trip a limit switch or the like to indicate that at least one article had passed through the feeder. The other thickness gage simply comprised a pair of contacting rollers which were forced apart when an article passed through the feeder, together with a limit switch which was actuated when the one roller moved away from the other by a predetermined amount, thereby indicating the passage of two or more articles through the feeder.

The difficulty with gages of the type described above which employ a single pair of separable rollers is that since the one roller is spring loaded to resiliently hold it in contact with the other roller, vibrations, shocks, or other factors may accidentally shift the movable roller in the pair to trip the limit switch and give a false indication of faulty operation. In addition, since an article is thrust into the roll pass defined between the rollers with a certain amount of force, the initial impact of the article on the movable roller may cause it to "bounce" in a sufficient amount to trip the limit switch and give a false indication. This is a serious problem in that it causes costly and unnecessary shutdowns and losses in production time.

As an overall object, the present invention seeks to provide new and improved apparatus for determining the thickness of a moving article whereby the apparatus will be affected only by the true thickness of the article while being unaffected by all extraneous factors, such as those discussed above.

More specifically, an object of the invention resides in the provision of means in a collator feeder for detecting the passage of more than one or less than one article, together with means for controlling operation of the collator in accordance with the condition detected by said means.

Still another object of the invention is to provide a collator of the type described which will achieve a much higher production rate than those previously known due to the fact that false indications of faulty operation are virtually eliminated.

It is often a problem in collators of the type described herein to provide satisfactory means for separating successive single articles from supply stacks and for transferring them to a conveyor. Most of the separator devices employed for this purpose make use of pneumatic "suckers" to which the foremost article in a stack of articles will become attached. After the foremost article is attached to the "suckers," a mechanism physically moves them, and the article carried thereby, to pinch rolls or the like which transfer the article to the aforesaid conveyor. The difficulty with most separators previously employed, however, is that they involve complicated mechanisms or are unsatisfactory in performance in one way or another. Accordingly, it is still a further object of the invention to provide a collator separator of the type described which is greatly improved over previously known devices and which will efficiently and expeditiously transfer articles from a plurality of supply stacks to a conveyor in timed relationship.

In accordance with the invention, hereinafter described, two pairs of rollers, rather than a single pair, are arranged in tandem in a collator feeder whereby an article traveling through the feeder will pass through both sets of rollers. One roller in each pair is movable relative to the other, and the movable rollers are carried on an elongated member which is pivotally connected to a spring-loaded support midway between the rollers. One end of the elongated member is adapted to trip a limit switch when, and only when, an article exceeding a predetermined thickness is disposed between both sets of rollers. With this arrangement, the spring-loaded support will urge the movable rollers into contact with the other or fixed rollers; and when an article passes through the first set of rollers, the elongated member will first pivot about its connection to the spring-loaded member until the article passes through the second set of rollers, at which point the elongated member will pivot about its connection to the spring-loaded support and will trip the aforesaid limit switch if the thickness of the article exceeds a predetermined limit. Since two rollers, rather than one, must be elevated in order to trip the limit switch, very little possibility exists of faulty indications of the type described above.

In accordance with another aspect of the invention, each of the supply stacks of the collator is mounted on a horizontally reciprocating table, while the "suckers" referred to above are carried on rocker arms extending radially outwardly from a shaft rotatable about a fixed horizontal axis at one end of the reciprocating table. With this arrangement, the rocker arms will be rotated into a horizontal position while the table moves toward the rocker arms to convey the foremost article in each stack of articles on the table into contact with the "suckers" carried on the rocker arms. At this point the "suckers" are evacuated whereby they will pick up the aforesaid foremost articles. Immediately thereafter, the rocker arms rotate downwardly while the table moves away from the "suckers" whereby one article is separated from each stack. Further rotation of the rocker arms will convey the separated articles to pinch rolls or the like where they are transferred onto the conveyor of the collator. As will be seen, the arrangement is such that successive single articles will be transferred to the conveyor with a minimum number of movable parts.

The above and other objects and features of the invention will become apparent from the following detailed description taken in connection with the accompanying drawings which form a part of this specification and in which:

FIG. 4 is a perspective view of the rocker arm assemblies of the invention which are employed to transfer envelopes or the like from stacks to a feeding mechanism;

FIG. 5 is an illustration of the relative positions of cams employed in the invention to synchronize operation of the various parts of the collator; and FIG. 6 is a schematic circuit diagram of the control apparatus for the collator of the invention.

Figure 1:
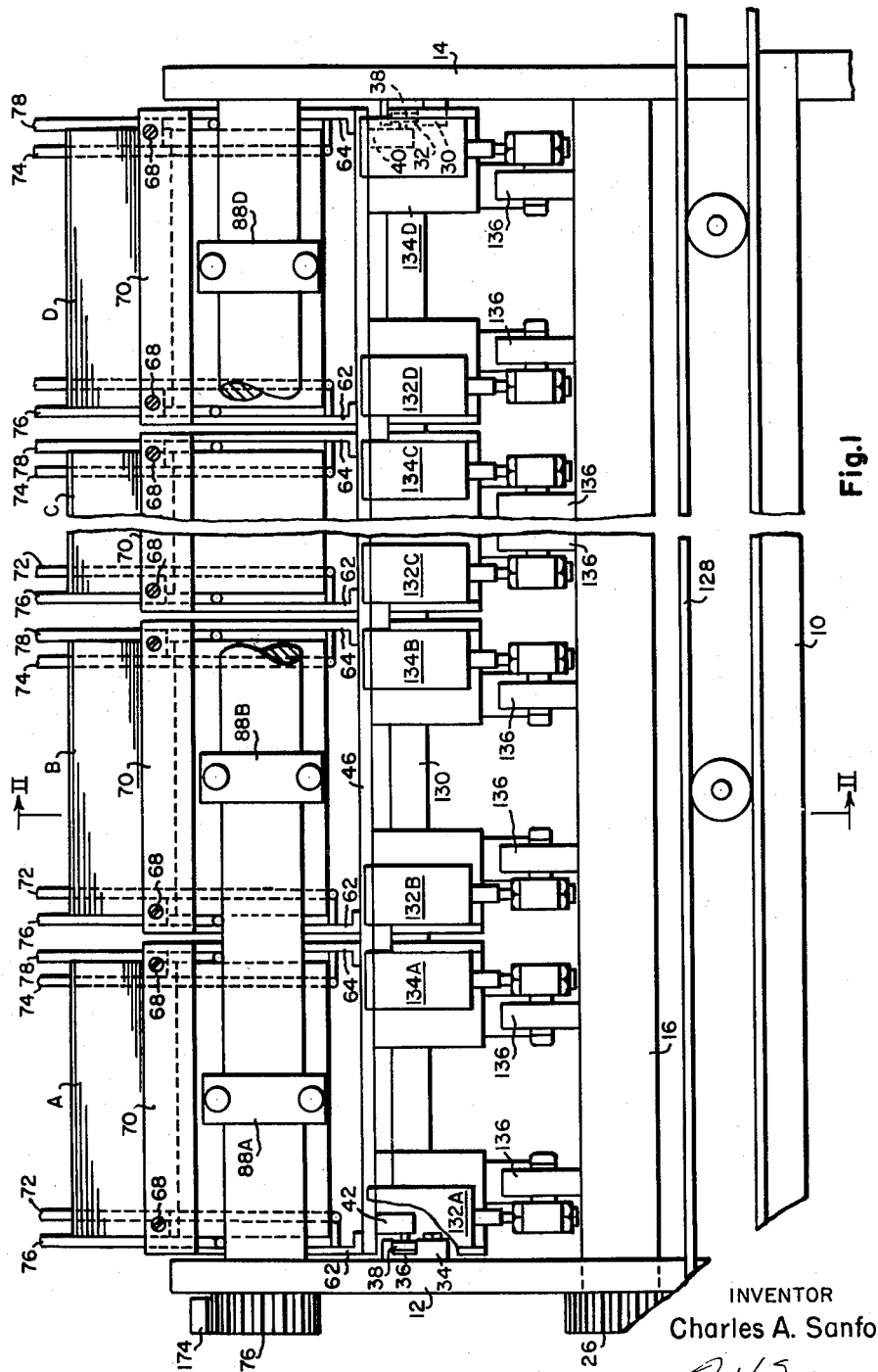
FIG. 1 is a partially broken-away front view of the collator of the present invention.
Figure 2:
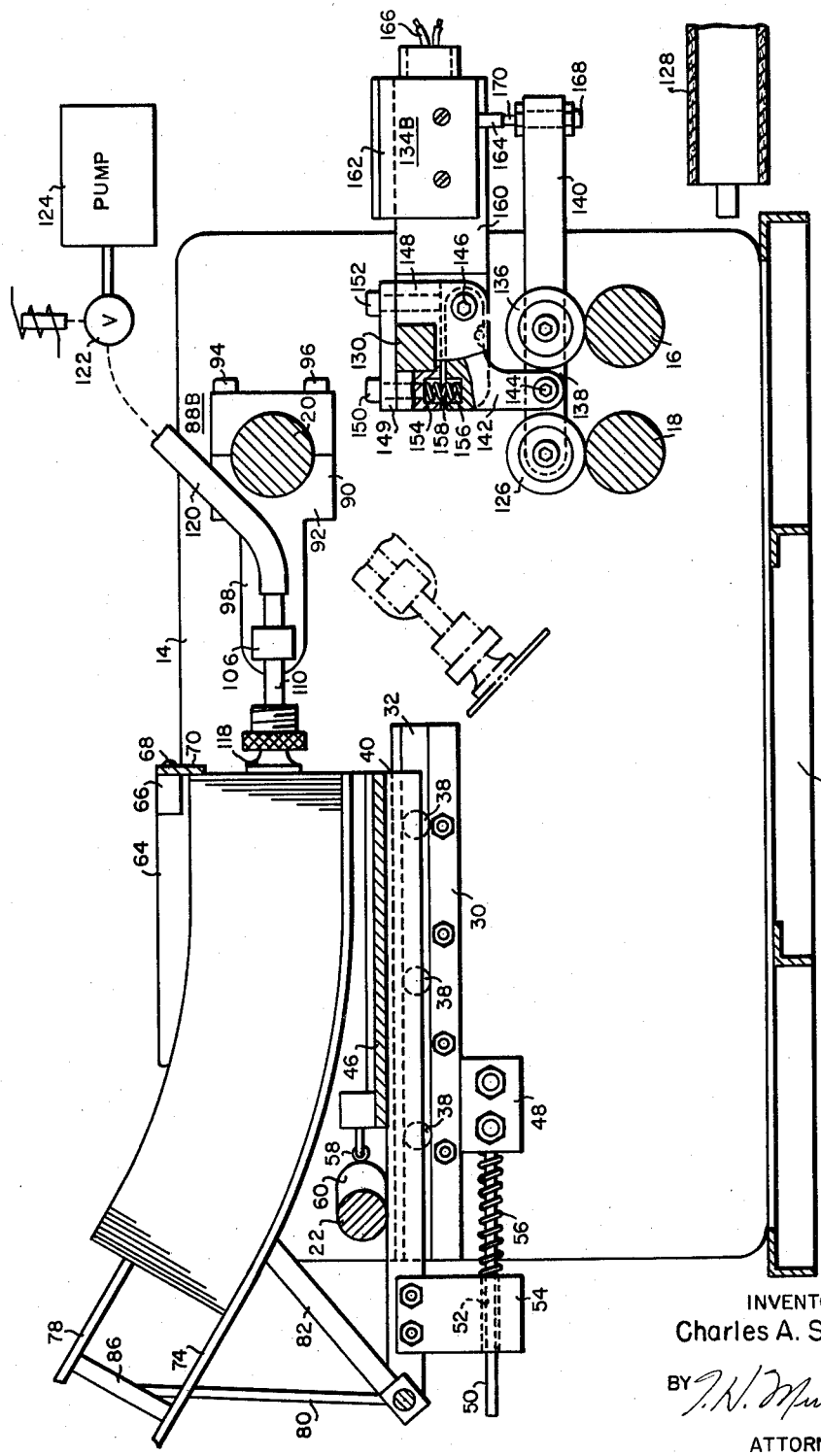
FIG. 2 is a cross-sectional view taken along line II—II of FIG. 1.
Figure 3:
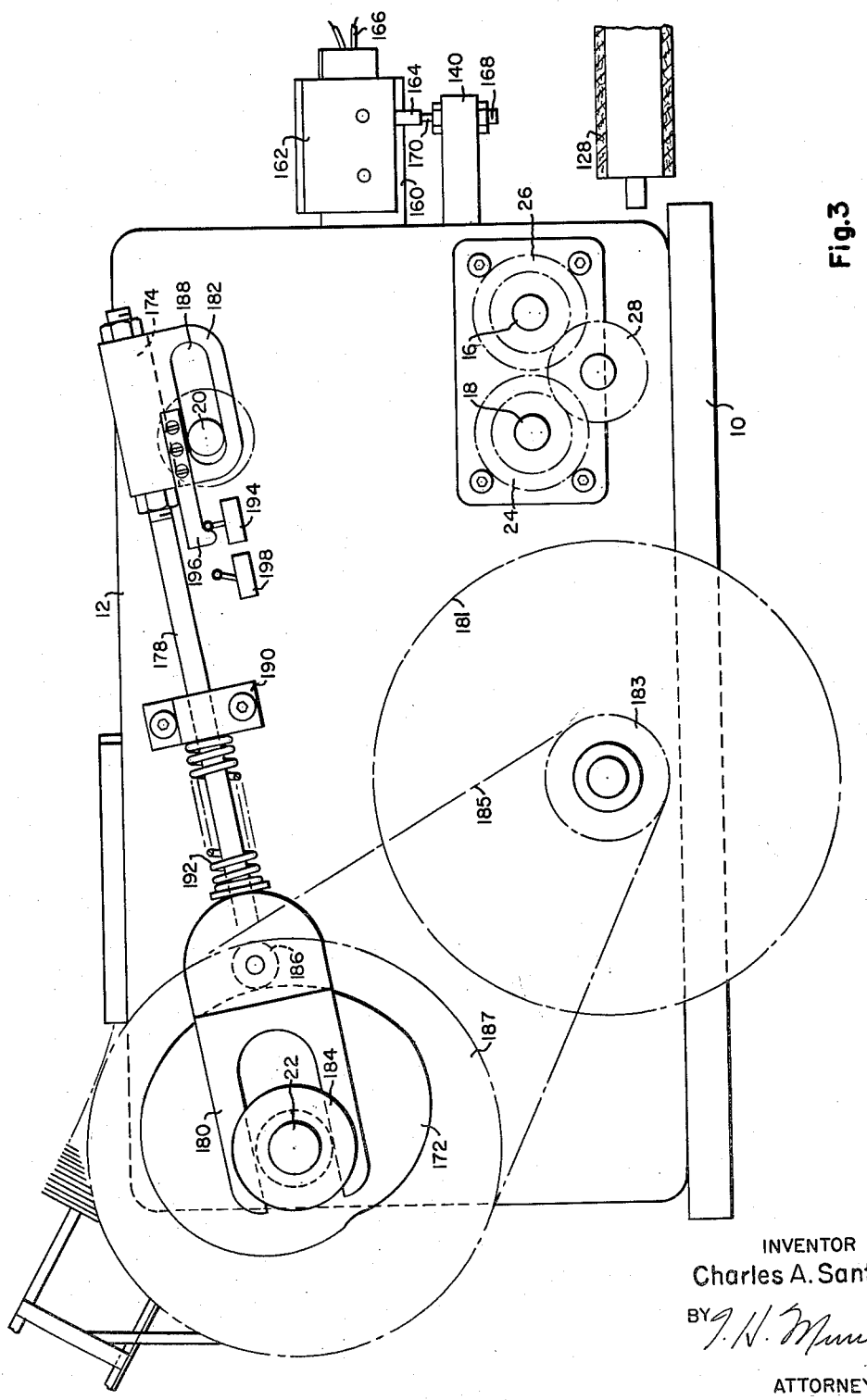
FIG. 3 is a left-hand side view of the apparatus shown in FIG. 1, illustrating the mechanism for rotating the rocker arm assembly of the collator shown herein.

Referring to FIGS. 1, 2 and 3, the embodiment of the invention shown herein comprises a base or frame structure 10, fabricated from angle irons, which supports two upright plates or side members 12 and 14. Extending between the plates 12 and 14, as best shown in FIG. 2, are four rolls or shafts 16, 18, 20 and 22. As will be understood, the opposite ends of the respective shafts 16—22 are supported in bearings, not shown, which are carried within the plates 12 and 14. As best shown in FIG. 3, the shafts 16 and 18 are interconnected and driven in the same direction by means of gears 24, 26 and 28. Means, not shown, are provided to rotate one of the gears 24, 26, or 28 to thereby drive the rolls 16 and 18 in synchronism.

Secured to the inside surface of upright member 14, at the upper left hand portion thereof as shown in FIG. 2, is a horizontally extending bar 30 having a slot or guideway 32 machined therein along its length. Similarly, as shown in FIG. 1, the upright member 12 has a bar 34 secured to its inside surface, with this bar also having a guideway or slot 36 machined along its length. As shown, the slots or guideways 32 and 36 receive a plurality of rollers 38 which are carried on elongated members 40 and 42. The members 40 and 42, in turn, carry a plate or table 46 therebetween, the arrangement being such that the table and its associated members 40 and 42 may reciprocate backward and forward in the slots 32 and 36. Supported below each of the bars 30 and 34, as best shown in FIG. 2 is a block 48 having a shaft or rod 50 extending outwardly therefrom in the direction of movement of the table 46. This shaft extends through an aperture 52 provided in a second block 54 which is carried on the rearward end of member 40 or 42, as the case may be. Disposed between the blocks 48 and 54 and encircling the rod 50 is a coil spring 56. It will be apparent that with this arrangement the springs 56 on each side of the assembly will normally urge the blocks 54, the members 40 and 42, and the table 46 to the left as shown in FIG. 2. Secured to the upper surface of table 46, at the trailing end thereof, is a cam follower 58 which engages a cam 60 keyed or otherwise securely fastened to the shaft 22, the arrangement being such that as the shaft 22 rotates, the cam 60 will force the table 46 to the right as shown in FIG. 2 for one-half revolution, while compressing the spring 56. On the next successive half revolution, the spring 56 will force the table 46 to the left to thereby impart a reciprocating motion to the table wherein one complete cycle of reciprocation is achieved for every complete revolution of the shaft 22 and cam 60.

Carried on the table 46 are a plurality of stacks of flat articles, such as envelopes, which are identified as A, B, C and D in FIG. 1, it being understood that the number of stacks may be extended to suit requirements. For purposes of explanation, it will be assumed that the articles in the various stacks are envelopes, however it should be understood that the apparatus may be used with articles such as sheets of paper, cards and the like. As shown, each stack of envelopes A–D is positioned between two upright plates 62 and 64 which are screwed or otherwise securely fastened to the upper surface of the table 46. Secured to the upper forward corners of each of the plates 62, 64 are blocks 66 (FIG. 2) to which is fastened, by means of screws 68, a baffle or bar 70 which extends across the upper portion of the opening formed between the plates 62 and 64 to engage the upper edge of the stack of envelopes A, B, C or D and thereby prevent them from sliding off the table 46. An inclined chute is provided for each stack of envelopes A, B, C or D by means of arcuate-shaped supporting rods 72, 74, 76 and 78 which are welded to the inside surfaces of the respective plates 62 and 64. As shown in FIG. 1, the lower arcuate-shaped rods 72 and 74 are spaced from the inside surfaces of plates 62 and 64 and provide a means for supporting the stacks of envelopes A, B, C or D against gravity. The upper rods 76 and 78 are flush against the inside surfaces of the plates 62 and 64 and provide a means for laterally guiding the stacks of envelopes. As shown in FIG. 2, the ends of the rods 72–78 which extend outwardly beyond the end of table 46 are supported by means of members 80 and 82. As will be understood, a plurality of such members 80 and 82 are provided along the length of the collator. The members 82 are each welded to the plates 62 and 64 between successive stacks of envelopes and have one end carried on a bar 84 which extends between the members 40 and 42 of the table assembly. The supporting members 80, then, are welded to the various members 82 as well as to a cross bar 86 provided between the rods 72 and 76 or 74 and 78, as the case may be.

Spaced along the length of shaft 20 are a plurality of rocker arm assemblies 88A, 88B, 88D, etc. One of these rocker arm assemblies is provided for each of the stacks of envelopes A, B, C and D and is positioned on the shaft 20 midway between the plates 62 and 64 for its particular stack. The details of each rocker arm are best shown in FIG. 4. They comprise a pair of blocks 90 and 92 which are fitted around the shaft 20 and secured thereto by means of cap screws 94 and 96. The block 92 has an extension 98 thereon which is slotted as at 100 and is provided with a bore for the reception of a transversely-extending shaft 102, the arrangement being such that the shaft 102 may be inserted into the bore and held securely therein by tightening a set screw 104 which will tend to clamp together the two portions of extension 98 provided by slot 100.

Carried on the opposite ends of shaft 102 are two fixtures 106 and 108 having bores extending therethrough for the reception of tubes 110 and 112. As shown, the fixtures 106 and 108 are slotted, as was the extension 98, whereby the tubes 110 and 112 may be securely held within the fixtures by tightening set screws 114 and 116. The tubes 110 and 112 are part of a sucker-holder assembly for supporting a rubber suction cap 118 or 119. As is best shown in FIG. 2, the caps 118 or 119 are adapted to engage the first envelope in each stack of envelopes A, B, C or D whereby, when the tubes 110 and 112 are evacuated, the first envelope in each stack of envelopes will "stick to" the suction cups 118 and 119. As shown in FIG. 2, each suction cap 118 or 119 is connected through tube 110 or 112 and a flexible hose 120 to a solenoid-operated valve 122. The valve 122, in turn, controls the evacuation of the tubes 110 and 112 by selectively connecting them to an evacuating pump, schematically indicated at 124.

In the operation of the device, the table 46 and the stacks of envelopes carried thereby will be forced to the right as shown in FIG. 2 by the action of cam 60. At the same time, the shaft 20 and rocker arms 88 will be rotated in a clockwise direction until they assume the generally horizontal position shown in FIG. 2. At this time, the table 46 will have traveled to its extreme forward position whereby the suction cups 118, 119 engage the first envelope in each stack. Thereupon, the valve 122 will be actuated to evacuate the tubes 110 and 112 whereby the foremost envelope in each stack will be picked up by the suction cups 118 and 119. In the following sequence of operation, the cam 60 continues to rotate whereby table 46 is moved to the left by springs 56, and at the same time the shaft 20 and rocker arms 88 are rotated in a counter-clockwise direction. Since the foremost envelope in each stack of envelopes is held on suction cups 118 and 119 by atmospheric pressure, these foremost envelopes will be rotated downwardly as shown by the dotted outline until the forward edge of the separated envelope enters the roll pass defined between roll 18 and a roller 126, whereupon the valve 122 will release the vacuum so that the envelopes are free to pass between the roll 18 and roller 126. After the envelope is inserted between the roll 18 and roller 126 and the vacuum released, the rocker arms 88 are again rotated in a clockwise direction until they assume the horizontal position shown in FIG. 2. At the same time, the table 46 which moved to its extreme left position when the rocker arms 88 rotated downwardly, is now forced to the right by cam 60 until it reaches the position shown in FIG. 2 where the next successive envelope is picked up by the suction cups 118 and 119. The foregoing process is, of course, repeated for each cycle of operation of the collator.

The individual envelopes separated from the respective stacks A, B, C and D by the rocker arm assemblies 88 are passed over rolls 16 and 18 to a belt conveyor, generally indicated at 128. The speed of the conveyor 128 is synchronized with the operation of the rocker arm assemblies 88 whereby it will travel the distance between successive rocker arms 88A, 88B, etc. during each cycle of operation. Thus, if it is assumed that rocker arm assembly 88A has transferred an envelope from stack A onto the conveyor 128, the conveyor will move to the right as shown in FIG. 1, until the envelope deposited by rocker arm assembly 88A is directly in front of stack B. During the time that the envelope travels from stack A to stack B, the rocker arm assembly 88B transfers an envelope over the rollers 16 and 18 so that an envelope from stack B is deposited on top of that from stack A on the conveyor 128. Similarly, after the conveyor has moved a sufficient distance so that the combination of envelopes from stacks A and B reaches the stack C, the rocker arm for this stack will have transferred an envelope to the conveyor so that now there is a stack of three envelopes on the conveyor arranged in the same sequence as the feeders A, B and C. That is, in the stack of three envelopes on conveyor 128, an envelope from stack A will be on the bottom, an envelope from stack B will be in the middle, and an envelope from stack C will be on the top. This process will continue until the stack of envelopes on conveyor 128 reaches the stack D where an envelope from this stack is passed over the rollers 16 and 18 and onto the group arranged on the conveyor.

It sometimes happens that the suction cups 118 and 119 on the rocker arm assemblies 88 will fail to pick up an envelope from their associated stack or will pick up two or more envelopes at the same time. It should be apparent that when this happens a defective group of articles will be arranged on the conveyor 128. That is, one of the groups of envelopes on the conveyor 128 may be missing an envelope from stack A, B, C or D; or, possibly one of the groups contains two or more envelopes from one of the stacks. Accordingly, some means must be provided to indicate which one of the rocker arm assemblies 88A—88D has failed to pick up an article from its associated supply stack or has picked up two or more articles at once. In addition, means must be provided to stop the conveyor 128 and the other working parts of the collator in order that an operator or attendant may add an article to a group on the conveyor or remove an excess article, as the case may be, before again starting the machine. Thus, if the rocker arm assembly 88B, for example, fails to pick up an article from stack B, some means must be provided to indicate that this rocker arm assembly is not functioning properly. Since the collator should stop as soon as the indication of faulty operation of rocker arm assembly 88B is given, the operator or attendant will know that the defective group of envelopes on the conveyor is directly in front of the stack B. He may then add an envelope or remove excess envelopes to correct the situation.

In order to sense the passage of more than one or less than one envelope over the rolls 16 and 18, means are provided including a bar 130 which extends between the upright supporting members 12 and 14 above the rolls 16 and 18. The bar 130 serves to support a plurality of thickness gages, with two such gages being provided for each stack of envelopes A, B, C, D, and so on. Thus, directly in front of stack A as shown in FIG. 1 and supported on bar 130, are thickness gages 132A and 134A. Similarly, in front of stack B and supported on bar 130 are two thickness gages 132 B and 134B. Each of the thickness gages identified by the numeral 132 is adapted to produce an indication whenever an envelope fails to pass over the rolls 16 and 18; whereas each of the thickness gages 134 provided for each stack of envelopes is adapted to produce an indication when two or more envelopes pass over the rolls 16 and 18.

As is best shown in FIG. 2, each of the thickness gages comprises the roller 126 in combination with a second roller 136 arranged in tandem therewith, the arrangement being such that an envelope will pass under each of the rollers 126 and 136 in traveling from the rocker arm assemblies 88 to the conveyor 128. As shown, each of the rollers 126 and 136 is supported on an elongated bar or arm 138 which has an extension 140 projecting outwardly beyond the second roller 136 and substantially parallel to a plane extending through the axes of the two rollers 126 and 136. Pivotally connected to bar 138 intermediate the rollers 126 and 136 is a generally L-shaped member 142 having the end of one of its legs pivotally connected to the bar 138 at 144 and the end of the other of its legs pivotally connected at 146 to a pair of flanges which extend downwardly from a supporting member 148, this member, in turn, being fastened to the bar 130 by means of plate 149 and cap screws 150 and 152. As will be understood, the L-shaped member is effectively sandwiched between the two flanges extending downwardly from member 148 and is free to pivot about point 146. The member 148, as well as the L-shaped member 142, are provided with bores at 154 and 156, respectively; and these bores receive the opposite ends of a coil spring 158. With this arrangement, it can be seen that the spring 158 will resiliently urge the bar 138 downwardly to move rollers 126 and 136 into contact with rolls 16 and 18. Carried on member 148 and projecting outwardly therefrom is a bracket 160 which supports a limit switch, generally indicated at 162. Limit switch 162 is provided with an actuating plunger identified at 164, the arrangement being such that when the plunger 164 is moved upwardly, the limit switch will be closed or opened, as the case may be. Limit switch 162 is provided with electrical leads 166 which are adapted to be connected to control circuitry, hereinafter described. As shown, the plunger 164 and, hence, the limit switch 162, are controlled by the movement of extension 140 on bar 138, the arrangement being such that the plunger 164 will be moved upwardly to actuate the limit switch 162 whenever the extension 140 likewise moves upwardly. The end of extension 140 is provided with a cap screw 168 whose shank portion 170 is adapted to engage the plunger 164, substantially as shown.

In operation, when an envelope is transferred from the suction cups 118 and 119 to the roll pass defined between roller 126 and roll 18, the roller 126 will initially move upwardly, thereby compressing the spring 158 and causing the bar 138 to rotate in a clockwise direction about pivot point 144. As will be seen, this causes the extension 140 and the shank portion 170 to move downwardly so that there is no possibility of actuating the limit switch 162 even though the roller 126 should "bounce" due to the initial impact of the envelope thereon, or for other reasons. After the envelope has passed between roller 126 and roll 18, it will then pass between roller 136 and roll 16. When this occurs, the roller 136 will be moved upwardly due to the thickness of the envelope so that the bar 138 is now rotated in a counter-clockwise direction about pivot point 144 to elevate the extension 140 and the shank portion 170. In the case of the thickness gages 132A, 132B, etc. the limit switch 162 is normally closed, and it will stay closed if no envelope passes under the rollers 126 and 136. However, if at least one envelope passes under the rollers, the extension 140 and shank portion 170 will be moved upwardly in an amount sufficient to open the limit switch 162. In the case of thickness gages 134A, 134B, etc. the limit switch 162 is normally open. This limit switch will be closed when, and only when, two or more envelopes pass under the rollers 126 and 136 to elevate the extension 140 and shank portion 170 in an amount sufficient to actuate the limit switch. That is, the limit switch 162 in this case will be actuated only if the thickness of the material passing under the rollers 126 and 136 is equal to the thickness of two or more envelopes.

Referring now to FIG. 3, the left end of the shaft 22, as shown in FIG. 1, is provided with a cam 172 adapted to impart reciprocating motion to a gear rack 174 which engages a gear 176 on the left end of the shaft 20 (see FIG. 1) which, in turn, controls rotation of the rocker arm assemblies 88. The cam 172 is operatively connected to the gear rack 174 by means of a rod or bar 178 having one end connected to a bifurcated plate 180 and its other end connected to a plate 182 which carries the gear rack 174. As shown, the bifurcations on plate 180 reciprocate in a peripheral groove provided in circular member 184 which is keyed or otherwise securely fastened to the shaft 22 adjacent cam 172. Plate 180 also carries a cam follower 186 which rides on the periphery of cam 172. The plate 182 is provided with a slot 188 which fits over the end of shaft 20 whereby the rod 178 will be guided along a straight line path by the joint action of the bifurcations on plate 180 and the slot 188 riding on shaft 20. Secured to the side of upright member 12 is a block 190 having an aperture therein through which the rod 178 extends. A coil spring 192 is interposed between the block 190 and the bifurcated plate 180 whereby the rod 178 is always urged to the left as shown in FIG. 3. Means, schematically illustrated at 181, 183, 185 and 187, are provided for rotating the shaft 22. Thus, as the shaft 22 rotates in a clockwise direction as viewed in FIG. 3, the rod 178 will be forced to the right, thereby rotating the shaft 20 in a clockwise direction and elevating the rocker arm assemblies 88. Rod 178 will continue to move to the right as shown in FIG. 3, until the rocker arm assemblies reach a horizontal position and pick up envelopes from the stacks A, B, C, and D, at which point the cam 172 will begin to permit the spring 192 to move rod 178 to the left whereby the shaft 20 and rocker arm assemblies 88 are rotated in a counter-clockwise direction. This action will continue until the rocker arm assemblies feed envelopes into the roll pass defined between roller 126 and roll 18, at which point cam 172 will again force rod 178 to the right to rotate the rocker arm assemblies 88 in a clockwise direction to repeat the cycle. Clockwise rotation of the rocker arm assemblies is indicated by closure of a normally open limit switch 194 which engages a nub 196 on the plate 182 when rod 178 moves to the right. Similarly, counter-clockwise rotation of the rocker arm assemblies 88 is indicated by closure of the normally open limit switch 198 which will engage the nub 196 when the rod 178 moves to the left.

Referring to FIG. 5, it will be seen that the shaft 22 has a cam 200 secured thereto as well as the cam 172 which controls the rocker arm assemblies 88 and the cam 60 which controls reciprocation of the envelope stack-supporting table 46. Cam 200 is employed to periodically close the normally open limit switch 202, which, in turn, controls the solenoid-operated valve 122 shown in FIG. 2, the arrangement being such that when the limit switch 202 is closed and the solenoid valve 122 is open, the suction cups 118 and 119 will be evacuated by the evacuating pump 124. With the position of the cams shown in FIG. 5, the table 46 will be moved to its extreme forward position as shown in FIG. 2. At this point, the cam 200 will close the limit switch 202 to open valve 122 and evacuate the suction cups 118 and 119 whereby the foremost envelope in each group of envelopes A, B, C and D will be picked up by the suction cups. The limit switch 202 will remain closed and the valve 122 open for about 270° of rotation of the shaft 22. When the limit switch 202 again opens, the cam 60 will have rotated to the point where the table 46 is fully retracted. At the same time, the cam 172 will have permitted the spring 192 to force rod 178 to the left to rotate the assemblies 88 into a generally vertical position where the envelopes held by the suction cups 118 and 119 are transferred to the roll passes defined between rollers 126 and the roll 18. Thus, the suction in cups 118 and 119 is released when the rocker arm assemblies 88 have rotated downwardly to transfer the envelopes to the aforesaid roll passes.

The indicating and control circuitry for each of the stacks of envelopes A, B, C and D is shown in FIG. 6, it being understood that this circuitry is duplicated for each stack. Assuming that the rocker arm assemblies 88 are moving downwardly in a counter-clockwise direction, the nub 196 on plate 182 will move to the left as shown in FIG. 6 to close limit switch 198. This action will energize relay 204 to close its normally open contacts 206. When contacts 206 close, they momentarily energize the relay 208 as well as a neon lamp 210 connected in parallel with the energizing coil of the relay 208. When relay 208 is energized, a holding circuit is provided therefor through its normally open contacts 212, which are now closed, and the normally closed contacts 213 of limit switch 162 in the thickness gage 132A at that particular station or stack of envelopes. That is, an energizing circuit is provided for the relay 208 from positive terminal 214 through contacts 212, which are now closed, the contacts 213 of limit switch 162 in gage 132A and the energizing coil of relay 208 to ground. It will be remembered that the limit switch 162 in thickness gage 132A will open when at least one envelope passes under the rollers 126 and 136. Consequently, if at least one envelope passes under these rollers, the limit switch 162 will open contacts 213 to break the holding circuit for relay 208 whereby the relay will become deenergized. However, if an envelope fails to pass under the rollers 126 and 136 and onto the conveyor 128, the contacts 213 of the limit switch will remain closed and relay 208 will remain energized as will the neon lamp 210. Under these conditions, the contacts 216 of relay 208 will also remain closed. When the rocker arm assemblies 88 rotate upwardy in a clockwise direction, the nub 196 will momentarily close the limit switch 194 thereby completing a circuit to the energizing winding of relay 219 from terminal 214 through the contacts of limit switch 194, and contacts 216 of relay 208. Once the relay 218 is energized, it will remain in this condition by virtue of the closure of its holding contacts 220. Energization of relay 218 also opens contacts 222 to break the energizing circuit 223 for the motor or motors 224 which rotate shafts 16, 18, 20 and 22. Thus, whenever relay 218 is energized, the collator will stop. This stoppage is due to the fact that an envelope failed to pass underneath the rollers 126 and 136 in front of the stack of envelopes A, and the neon lamp 210 will remain energized to indicate that an envelope failed to pass from stack A as well as the neon lamp 219 connected in shunt with the energizing winding for relay 218. As will be understood, a pair of neon lamps 210 and 219 are provided for each of the stacks A, B, C, and D and may be conveniently located above the supporting members 12 and 14 in front of the machine where they may be easily observed by an operator. It is usually most convenient to position the indicating lamps directly in front of their corresponding stack of envelopes in order that the improperly functioning set of rocker arms may be readily identified.

Thus, if both the neon lamps 210 and 219 are energized for stack A, the operator will know that an envelope from stack A is missing in the group on conveyor 128 directly in front of this stack. After inserting the missing envelope from stack A in this group, the operator will depress reset switch 226 which will break the circuit to relays 208 and 218. This will extinguish the neon lamps 210 and 219 and close contacts 222 to again energize the motor or motors which initiate operation of the collator.

If two or more envelopes pass under the rollers 126 and 136 of any one of the thickness gages 134A, 134B, etc., the contacts of limit switch 162 at that particular station will be closed. This will again energize neon lamp 219 and relay 218 to open contacts 222 and stop the motor or motors 224. Since in this case the neon lamp 210 is not energized while the lamp 219 is energized, the operator knows that two or more envelopes have passed beneath the rollers 126 and 136 in front of a particular stack. He will then remove the necessary number of excess envelopes from the conveyor 128 and will again depress the push button switch 226 to initiate operation of the collator.

The invention thus provides a collator which will efficiently and expeditiously transfer flat articles and the like from supply stacks to a conveyor with the articles arranged in piles on the conveyor in the same sequence as the individual stacks. At the same time, the invention provides means in a collator for accurately indicating the passage of more than one or less than one article from a supply stack to the conveyor.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for determining the thickness of an article as it moves along a path of travel comprising, in combination, first and second pairs of contacting roller members arranged in tandem along the path of travel of said article whereby the article will pass between the respective pairs of roller members as it travels along said path, each of said pair of roller members comprising a first roller having a fixed axis and a second roller having an axis parallel to the axis of said first roller and movable relative thereto, means for supporting the second roller in each pair comprising an elongated member on which said second rollers are carried, said elongated member extending substantially parallel to a plane passing through the axes of said second rollers and having an extension projecting beyond the last pair of rollers through which an article passes along said path of travel, a generally L-shaped support member having one leg extending substantially parallel to said elongated member and another leg extending substantially perpendicular to said one leg, means pivotally connecting the end of said one leg to a fixed point, means pivotally connecting the end of said other leg to said elongated member intermediate said second rollers, spring means urging said L-shaped member to pivot about said fixed point whereby the second rollers are resiliently held in contact with the first rollers, limit switch means positioned adjacent the side of said extension opposite said path of travel and actuable upon a predetermined amount of movement of the extension away from said path of travel, the arrangement being such that when an article passes through said first pair of roller members the extension will rotate away from the limit switch means until the article passes through said second pair of roller members whereupon the extension will be moved toward the limit switch means and will actuate the same if the thickness of an article passing through the roller members exceeds a predetermined limit, and circuit means for indicating actuation of said limit switch means.

2. Apparatus for determining the thickness of an article as it moves along a path of travel comprising, in combination, first and second pairs of contacting roller members arranged in tandem along the path of travel of said article whereby the article will pass between the respective pairs of roller members as it travels along said path, each of said pair of roller members comprising a first roller having a fixed axis and a second roller having an axis moveable relative thereto, means for driving both of said first rollers in the same direction, means for supporting the second roller in each pair comprising an elongated member on which said second rollers are carried, said elongated member extending substantially parallel to a plane passing through the axes of said second rollers and having an extension projecting beyond the last pair of rollers through which an article passes along said path of travel, an L-shaped support member having one end pivotally connected to a fixed point and another end pivotally connected to said elongated member intermediate said second rollers, resilient means acting on said L-shaped member to urge said second rollers into contact with said first rollers, limit switch means positioned adjacent the side of said extension opposite said path of travel and actuable upon a predetermined amount of movement of the extension away from said path of travel, the arrangement being such that when an article passes through said first pair of roller members the extension will rotate away from the limit switch means and toward the path of travel until the article passes through said second pair of roller members whereupon the extension will be moved toward the limit switch means and will actuate the same if the thickness of an article passing through the roller members exceeds a predetermined limit, and circuit means for indicating actuation of said limit switch means.

3. Apparatus for determining the thickness of an article as it moves along a path of travel comprising, in combination, first and second pairs of contacting roller members arranged in tandem along the path of travel of said article whereby the article will pass between the respective pairs of roller members as it travels along said path, each of said pairs of roller members comprising a first roller having a fixed axis and a second roller having an axis parallel to the axis of said first roller and movable relative thereto, means for supporting the second roller in each pair comprising an elongated member on which said second rollers are carried, an extension on said elongated member projecting beyond the last pair of rollers through which an article passes along said path of travel, a member having one end pivotally connected to a fixed point and another end pivotally connected to said elongated member intermediate said second rollers, resilient means acting on said last-mentioned member to urge said second rollers into contact with said first rollers, limit switch means positioned adjacent the side of said extension opposite said path of travel and actuable upon a predetermined amount of movement of the extension away from said path of travel, the arrangement being such that when an article passes through said first pair of roller members the extension will rotate away from the limit switch means and toward said path of travel until the article passes through said second pair of roller members whereupon the extension will be moved toward the limit switch means and will actuate the same if the thickness of an article passing through the roller members exceeds a predetermined limit, and circuit means for indicating actuation of said limit switch means.

4. Apparatus for determining the thickness of an article as it moves along a path of travel comprising, in combination, first and second pairs of contacting roller members arranged in tandem along the path of travel of said article whereby the article will pass between the respective pairs of roller members as it travels along said path, each of said pairs of roller members comprising a first roller having a fixed axis and a second roller having an axis parallel to the axis of said first roller and movable relative thereto, means for driving the first roller in each pair in the same direction, means for supporting the second roller in each pair comprising an elongated member on which said second rollers are carried, said elongated member having an extension projecting beyond the last pair of rollers through which an article passes along said path of travel, spring means pivotally connected to said elongated member intermediate said second rollers for resiliently urging the second rollers into contact with said first rollers, limit switch means positioned adjacent the side of said extension opposite said path of travel and actuable upon a predetermined amount of movement of the extension away from said path of travel, the arrangement being such that when an article passes through said first pair of roller members the elongated member will rotate about the pivotal connection of said spring means whereby the extension will be moved toward said path of travel until the article passes through said second pair of roller members whereupon the elongated member will rotate in the opposite direction about the pivotal connection of said spring means and will be moved toward the limit switch means to actuate the same if the thickness of an article passing through the roller members exceeds a predetermined limit, and circuit means for indicating actuation of said limit switch means.

5. Apparatus for determining the thickness of an article as it moves along a path of travel comprising, in combination, first and second pairs of contacting roller members arranged in tandem along the path of travel of said article whereby the article will pass between the respective pairs of roller members as it travels along said path, each of said pairs of roller members comprising a first roller having a fixed axis and a second roller having an axis parallel to the axis of said first roller and movable relative thereto, means for supporting the second roller in each pair comprising an elongated member on which said second rollers are carried, said elongated member extending substantially parallel to a plane passing through the axes of said second rollers, spring means pivotally connected to said elongated member intermediate said second rollers for resiliently urging the second rollers into contact with said first rollers limit switch means actuable by movement away from said path of travel of the end of said elongated member closest to said second pair of roller members, the arrangement being such that when an article passes through said first pair of roller members said end of the elongated member will rotate about the pivotal connection of said spring means away from the limit switch means and toward the path of travel until the article passes through said second pair of rollers whereupon the said end of the elongated member will be moved toward the limit switch means and will actuate the same if the thickness of an article passing through the roller members exceeds a predetermined limit, and circuit means for indicating actuation of said limit switch means.

6. Apparatus for determining the thickness of a moving article traveling along a conveyor comprising, in combination, a pair of rollers arranged in tandem above said conveyor whereby an article will pass between the conveyor and the rollers as it travels along the conveyor, means for supporting the rollers comprising an elongated member on which said rollers are carried, said elongated member extending substantially parallel to a plane passing through the axes of said rollers and having an extension projecting beyond the last roller under which an article passes as it travels along said conveyor, a generally L-shaped support member having one leg extending substantially parallel to said elongated member and another leg extending substantially perpendicular to said one leg, means pivotally connecting the end of said one leg to a fixed point, means pivotally connecting the end of said other leg to said elongated member intermediate said rollers, spring means urging said L-shaped member to pivot about said fixed point whereby the rollers are resiliently urged into contact with said conveyor, limit switch means positioned adjacent the side of said extension opposite said conveyor and actuable upon a predetermined amount of movement of the extension away from the conveyor, the arrangement being such that when an article passes beneath said first roller, the extension will rotate away from the limit switch means and toward the conveyor until the article passes under said second roller whereupon the extension will be moved toward the limit switch means and will actuate the same if the thickness of an article passing beneath the rollers exceeds a predetermined limit, and circuit means for indicating actuation of the limit switch means.

7. Apparatus for determining the thickness of a moving article traveling along a conveyor comprising, in combination, a pair of rollers arranged in tandem above said conveyor whereby an article will pass between the conveyor and the rollers as it moves along the conveyor, means for supporting the roller members comprising an elongated member on which said rollers are carried, said elongated member extending substantially parallel to a plane passing through the axes of said rollers and having an extension projecting beyond the last roller under which an article passes as it travels along said conveyor, a member having one end pivotally connected to a fixed point and another end pivotally connected to said elongated member intermediate said rollers, spring means urging said last-mentioned member to rotate about said fixed point to thereby urge the rollers into contact with said conveyor, limit switch means adjacent the side of said extension opposite said conveyor and actuable upon a predetermined amount of movement of the extension away from the conveyor, the arrangement being such that when an article passes under said first roller, the extension will rotate away from the limit switch means toward the conveyor until the article passes under said second roller whereupon the extension will be moved toward the limit switch means and will actuate same if the thickness of an article passing underneath the rollers exceeds a predetermined limit, and circuit means for indicating actuation of said limit switch means.

8. Apparatus for determining the thickness of a moving article traveling along a conveyor comprising, in combination, a pair of rollers arranged in tandem above said conveyor whereby an article will pass between the conveyor and the rollers as it moves along the conveyor, means for supporting the rollers comprising an elongated member on which said rollers are carried, said elongated member extending substantially parallel to a plane passing through the axes of said rollers, spring means pivotally connected to said elongated member intermediate said rollers for urging the rollers into contact with said conveyor, limit switch means actuable by movement away from said conveyor of the end of said elongated member closest to the last roller of said pair of rollers under which an article passes in traveling along said conveyor, the arrangement being such that when an article passes under said first roller the elongated member will rotate about the pivotal connection of said spring means whereby said end will move away from the limit switch means and toward the conveyor until the article passes under said second roller whereupon the said end will be moved toward the limit switch means and will actuate the same if the thickness of an article passing underneath the rollers exceeds a predetermined limit, and circuit means for indicating actuation of the limit switch means.

9. Apparatus for determining the thickness of a moving article traveling along a conveyor comprising, in combination, a pair of rollers arranged in tandem above said conveyor whereby an article will pass between the conveyor and the rollers as it moves along the conveyor, means for supporting the rollers comprising an elongated member on which said rollers are carried, said elongated member extending substantially parallel to a plane passing through the axes of said rollers, spring means pivotally connected to said elongated member intermediate said rollers for resiliently urging the elongated member toward the conveyor whereby the rollers will be pressed against said conveyor, electrical switch means actuable by movement of said elongated member away from the conveyor by a predetermined amount when an article is under both of said rollers, and a device responsive to actuation of said switch means for indicating that an article is under both of said rollers.

10. In a collator of the type having a conveyor adapted to receive flat articles at a plurality of receiving stations for the progressive forming of groups of articles on the conveyor, and a plurality of article feeders adapted to separate successive single articles from supply stacks and to deliver the separated articles to said stations; the improvement in each of said article feeders of means for indicating the passage of more than one or less than one article to said conveyor comprising first and second rolls across which said articles pass in traveling to said conveyor, said rolls having their axes lying in a common plane, a first thickness sensing device cooperatively associated with said rolls for producing an indication whenever an article does not pass over said rolls, and a second thickness sensing device cooperatively associated with said rolls for producing an indication whenever two or more articles pass over said rolls, each of said thickness sensing devices including first and second rollers arranged in tandem adjacent said rolls whereby an article will pass between said rolls and the rollers as it travels to said conveyor, means for supporting the rollers comprising an elongated member on which said rollers are carried, said elongated member extending substantially parallel to a plane passing through the axes of said rollers and having an extension projecting beyond the last roller under which an article passes in traveling to said conveyor, a generally L-shaped support member having one leg extending substantially parallel to said elongated member and another leg extending substantially perpendicular to said one leg, means pivotally connecting the end of said one leg to a fixed point, means pivotally connecting the end of said other leg to said elongated member intermediate said rollers, spring means urging said L-shaped member to pivot about said fixed point whereby the rollers are resiliently held in contact with said rolls, and limit switch means positioned adjacent the side of said extension opposite said rolls and actuable upon a predetermined amount of movement of the extension away from said rolls, the arrangement being such that when an article passes under said first roller the extension will rotate away from the limit switch means and toward said rolls until the article passes under the second roller whereupon the extension will be moved toward the limit switch means and will actuate the same if the thickness of an article or articles passing through the rollers exceeds a predetermined limit.

11. In a collator of the type having a conveyor adapted to receive flat articles at a plurality of receiving stations for the progressive forming of groups of articles on the conveyor, and a plurality of article feeders adapted to separate successive single articles from supply stacks and to deliver the separated articles to said stations; the improvement in each of said article feeders of means for indicating the passage of more than one or less than one article to said conveyor comprising first and second rolls across which said articles pass in traveling to said conveyor, said rolls having their axes lying in a common plane, a first thickness sensing device cooperatively associated with said rolls for producing an indication whenever an article does not pass over said rolls, and a second thickness sensing device cooperatively associated with said rolls for producing an indication whenever two or more articles pass over said rolls, each of said thickness sensing devices including first and second rollers arranged in tandem adjacent said rolls whereby each roller will contact an associated one of said rolls and an article will pass between the rollers and the rolls as it travels to said conveyor, means for supporting the rollers comprising an elongated member on which said rollers are carried, said elongated member extending substantially parallel to a plane passing through the axes of said rollers and having an extension projecting beyond the last roller under which an article passes in traveling to said conveyor, a member having one end pivotally connected to a fixed point and another end pivotally connected to said elongated member intermediate said rollers, spring means urging said last-named member to pivot about said fixed point whereby said rollers are resiliently held in contact with said rolls, and limit switch means positioned adjacent the side of said extension opposite said rolls and actuable upon a predetermined amount of movement of the extension away from said rolls, the arrangement being such that when an article passes under said first roller the extension will rotate away from the limit switch means until the article passes under the second roller whereupon the extension will be moved toward the limit switch means and will actuate the same if the thickness of an article passing under the rollers exceeds a predetermined limit.

12. In a collator of the type having a conveyor adapted to receive flat articles at a plurality of receiving stations for the progressive forming of groups of articles on the conveyor, and a plurality of article feeders adapted to separate successive single articles from supply stacks and to deliver the separated articles to said stations; the improvement in each of said article feeders of means for indicating the passage of more than one or less than one article to said conveyor comprising first and second rolls across which said articles pass in traveling to said conveyor, a first thickness sensing device cooperatively associated with said rolls for producing an indication whenever an article does not pass over said rolls, and a second thickness sensing device cooperatively associated with said rolls for producing an indication whenever two or more articles pass over said rolls, each of said thickness sensing devices comprising first and second rollers arranged in tandem adjacent said rolls whereby each roller is adapted to engage a cooperating one of said rolls and an article traveling to said conveyor will pass between the rolls and the rollers, means for supporting the rollers comprising an elongated member on which the rollers are carried, spring means pivotally connected to said elongated member intermediate said rollers for resiliently urging the rollers into contact with said rolls, and limit switch means actuable by movement away from said rolls of the end of said elongated member closest to the second roller under which an article passes, the arrangement being such that when an article passes under the first roller the said end will rotate away from the limit switch means until the article passes under the second roller whereupon the said end will be moved toward the limit switch means to actuate the same if the thickness of the article passing under the rollers exceeds a predetermined limit.

13. In a collator of the type having a conveyor adapted to receive flat articles at a plurality of receiving stations for the progressive forming of groups of articles on the conveyor and a plurality of article feeders adapted to separate successive single articles from supply stacks and to deliver the separated articles to said stations; the improvement in each of said article feeders of means for indicating the passage of more than one or less than one article to said conveyor comprising first and second rolls across which said articles pass in traveling to said conveyor, a first thickness sensing device cooperatively associated with said rolls for producing an indication whenever an article does not pass over said rolls, and a second thickness sensing device cooperatively associated with said rolls for producing an indication whenever two or more articles pass over said rolls, each of said thickness gages including a pair of movable rollers each of which is adapted to engage an associated one of said rolls whereby an article will pass between the rolls and the rollers in traveling to said conveyor, and limit switch means actuable by movement of said rollers when an article of a predetermined thickness or greater passes between both rolls and their associated rollers.

14. In a collator of the type having a conveyor adapted to receive flat articles at a plurality of receiving stations for the progressive forming of groups of articles on the conveyor and a plurality of article feeders adapted to separate successive single articles from supply stacks and to deliver the separated articles to said stations; the improvement in each of said article feeders of means for indicating the passage of more than one or less than one article to said conveyor comprising first and second rolls across which articles pass in traveling to said conveyor, a first thickness sensing device cooperatively associated with said rolls for producing an indication whenever an article does not pass over said rolls, said first thickness sensing device comprising a pair of movable rollers each of which is adapted to engage an associated one of said rolls whereby an article will pass between the rolls and the rollers in traveling to said conveyor, limit switch means actuable by movement of the rollers of said first thickness sensing device when a single article passes between both rolls and their associated rollers, and a second thickness sensing device for producing an indication whenever two or more articles pass over said rolls, said second thickness sensing device comprising a pair of movable rollers each of which is adapted to engage an associated one of said rolls whereby an article will pass between the rolls and the rollers in traveling to said conveyor, and limit switch means actuable by movement of the rollers of said second thickness sensing device when two or more articles pass between both rolls and their associated rollers.

15. The combination claimed in claim 14 and including means for indicating actuation of the limit switch means associated with said first thickness sensing device, and means for indicating actuation of the limit switch means associated with said second thickness sensing device.

16. The combination claimed in claim 14 and including means for disabling said collator upon actuation of the limit switch means associated with said second thickness sensing device.

17. The combination claimed in claim 14 and including means for disabling the collator upon actuation of the limit switch means associated with said second thickness sensing device, as well as means for disabling the collator during a cycle of operation when the limit switch means associated with said first thickness sensing device is not actuated.

18. In a collator of the type having a conveyor adapted to receive flat articles at a plurality of receiving stations for the progressive forming of groups of articles on the conveyor, the combination of a table mounted for reciprocating movement along a horizontal path, a plurality of article-receiving inclined chutes arranged on said table in side-by-side relationship, a stop member at the bottom of each of said chutes and positioned to engage the upper portion of the foremost article in a stack of articles disposed in the chute, said chutes being positioned on the table whereby the foremost articles in the respective stacks of articles will all lie in a common horizontal plane, a single shaft rotatable about a fixed horizontal axis extending parallel to the plane of said table, a plurality of rocker arm assemblies carried on said shaft with one rocker arm assembly being positioned directly in front of each chute on said table, each of said rocker arm assemblies comprising a single rigid arm, suction cups fixed on the extremities of said rigid arms whereby the suction cups will always be at a fixed radial distance from the axis of said shaft, and means for synchronizing movement of said table with the rotation of said shaft whereby the table will travel in one direction to move the foremost article in each stack of articles into contact with the suction cups on said rocker arm assemblies while the assemblies are rotated into a horizontal position where they may receive said foremost articles, the arrangement being such that after the foremost articles are secured to the suction cups the table will travel in the other direction while the rocker arm assemblies are rotated by said shaft into a position where said foremost articles may be transferred to said conveyor.

19. In a collator of the type having a conveyor adapted to receive flat articles at a plurality of receiving stations for the progressive forming of groups of articles on the conveyor, the combination of a table mounted for reciprocating movement along a horizontal path, a plurality of article-receiving inclined chutes arranged on said table in side-by-side relationship, stacks of flat articles disposed in said inclined chutes, said chutes being positioned on the table whereby the foremost articles in the respective stacks of articles all lie in a common horizontal plane, a shaft rotatable about a fixed horizontal axis, rocker arm assemblies carried on said shaft with one rocker arm assembly being positioned directly in front of each chute on said table, each of said rocker arm assemblies comprising a single rigid arm, suction cups fixed on the extremities of said rigid arms whereby the fixed suction cups will always be at a fixed radial distance from the axis of said shaft, and means for synchronizing movement of said table with the rotation of said shaft whereby the table will travel in one direction to move the foremost article in each stack of articles into contact with the suction cups on said rocker arm assemblies while the assemblies are rotated into a horizontal position where they may receive the foremost articles, the arrangement being such that after the foremost articles are secured to the suction cups the table will travel in the other direction while the rocker arm assemblies are rotated by said shaft to a position where said foremost articles may be transferred to said conveyor.

20. In a collator of the type having a conveyor adapted to receive flat articles at a plurality of receiving stations for the progressive forming of groups of articles on the conveyor, the combination of a table mounted for reciprocating movement, a plurality of article-receiving inclined chutes arranged on said table in side-by-side relationship, each of said chutes being adapted to receive a stack of flat articles and being positioned on the table whereby the foremost article in the respective stacks of articles will all lie in a common plane, a shaft positioned adjacent said table and rotatable about a fixed horizontal axis, rocker arm assemblies carried on said shaft with one rocker arm assembly being positioned directly in front of each chute on said table, each of said rocker arm assemblies comprising a single rigid arm, suction cups fixed on the extremities of said rigid arms whereby the suction cups will always be at a fixed radial distance from the axis of said shaft, and means for synchronizing movement of said table with the rotation of said shaft whereby the table will travel in one direction to move the foremost article in each stack of articles into contact with the suction cups on said rocker arm assemblies while the assemblies are rotated into a position where they may receive said foremost articles, the arrangement being such that after the foremost articles are secured to the suction cups the table will travel in the other direction while the rocker arm assemblies are rotated by said shaft to a position where said foremost articles may be transferred to said conveyor.

21. In a collator of the type having a conveyor adapted to receive flat articles at a plurality of receiving stations for the progressive forming of groups of articles on the conveyor, the combination of a table mounted for reciprocating movement along a horizontal path, a plurality of article-receiving chutes arranged on said table side-by-side relationship and adapted to receive a stack of flat articles therein, a shaft positioned adjacent said table and rotatable about a fixed horizontal axis, rocker arm assemblies carried on said shaft with one rocker arm assembly being positioned directly in front of each chute on said table, each of said rocker arm assemblies comprising a single rigid arm, suction cups fixed on the extremities of said rigid arms whereby the suction cups will always be at a fixed radial distance from the axis of said shaft, and means for synchronizing movement of said table with the rotation of said shaft whereby the foremost article in each stack of articles carried in the respective chutes may be picked up by the suction cups and transferred by the rocker arm assemblies to a position where said foremost articles may be transferred to said conveyor.

22. In a collator of the type having a conveyor adapted to receive flat articles at a plurality of receiving stations for the progressive forming of groups of articles on the conveyor, the combination of a table mounted for reciprocating movement along a horizontal path, a plurality of article-receiving inclined chutes arranged on said table in side-by-side relationship, a stop member at the bottom of each of said chutes and positioned to engage the upper portion of the foremost article in a stack of articles disposed in the chute, said chutes being positioned on the table whereby the foremost articles in the respective stacks of articles will all lie in a common horizontal plane, a shaft rotatable about a fixed horizontal axis extending parallel to the plane of said table, rocker arm assemblies carried on said shaft with one rocker arm assembly being positioned directly in front of each chute on said table, suction cups carried on the extremities of said rocker arm assemblies, a pair of rolls rotatable about axes lying in a common horizontal plane, said axes being parallel to the axis of said shaft, means for synchronizing movement of said table with the rotation of said shaft whereby the table will travel in one direction to move the foremost article in each stack of articles into contact with the suction cups on said rocker arm assemblies while the assemblies are rotated into a horizontal position where they may receive said foremost articles, the arrangement being such that after the foremost articles are secured to the suction cups the table will travel in the other direction while the rocker arm assemblies are rotated by said shaft to a position where said foremost articles may be transferred onto said rolls, first thickness sensing devices cooperatively associated with said rolls for producing an indication whenever an article from any one of said stacks of articles does not pass over said rolls, and second thickness sensing devices cooperatively associated with said rolls for producing an indication whenever two or more articles from any one of said stacks of articles pass over said rolls, each of said thickness gages including a pair of movable rollers each of which is adapted to engage an associated one of said rollers whereby an article will pass between the rolls and the rollers in traveling to said conveyor, and limit switch means actuable by movement of said rollers when an article of a predetermined thickness or greater passes between both rolls and their associated rollers.

References Cited in the file of this patent

UNITED STATES PATENTS

| | | |
|---|---|---|
| 1,035,649 | Stanfield et al. | Aug. 13, 1912 |
| 2,637,552 | Watson | May 5, 1953 |
| 2,743,924 | Elliott et al. | May 1, 1956 |
| 2,753,180 | Thomas | July 3, 1956 |